United States Patent
Ogawa

(10) Patent No.: US 10,030,760 B2
(45) Date of Patent: Jul. 24, 2018

(54) APPARATUS AND METHOD FOR SUPPLYING LUBRICANT TO MOVABLE MEMBER OF INSTRUMENT

(71) Applicant: FANUC CORPORATION, Minamitsuru-gun, Yamanashi (JP)

(72) Inventor: Hisashi Ogawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 140 days.

(21) Appl. No.: 15/066,067

(22) Filed: Mar. 10, 2016

(65) Prior Publication Data

US 2016/0265648 A1 Sep. 15, 2016

(30) Foreign Application Priority Data

Mar. 13, 2015 (JP) .................................. 2015-051062

(51) Int. Cl.
*F16H 57/04* (2010.01)
*F16H 57/02* (2012.01)

(52) U.S. Cl.
CPC ......... *F16H 57/0408* (2013.01); *F16H 57/02* (2013.01); *F16H 57/045* (2013.01)

(58) Field of Classification Search
CPC .. F16H 57/0408; F16H 57/02; F16H 57/0405; F16H 61/0009; F16N 3/10; F16C 33/6625; F16C 33/6622; F01M 11/0408
USPC ....................................................... 184/106
See application file for complete search history.

(56) References Cited

U.S. PATENT DOCUMENTS

| 7,325,653 | B2 | 2/2008 | Gunderson et al. |
| 7,357,225 | B2 * | 4/2008 | Dorian ............... F01M 11/0408 123/196 R |
| 8,434,595 | B2 * | 5/2013 | Choi ................... F16H 61/0009 184/1.5 |
| 8,651,238 | B2 | 2/2014 | Kirst et al. |
| 2009/0026014 | A1 * | 1/2009 | Martin, III .......... F16H 57/0408 184/1.5 |
| 2012/0241257 | A1 * | 9/2012 | Kuykendall .............. F16N 3/10 184/5.1 |
| 2015/0007691 | A1 * | 1/2015 | Schnurr ................... F16H 57/02 74/606 R |

FOREIGN PATENT DOCUMENTS

| DE | 4030524 A1 | 4/1991 |
| DE | 4334864 C2 | 1/2003 |
| DE | 102004023250 A1 | 12/2004 |
| DE | 202008010126 U1 | 10/2008 |

(Continued)

*Primary Examiner* — William E Dondero
*Assistant Examiner* — Robert T Reese
(74) *Attorney, Agent, or Firm* — RatnerPrestia

(57) ABSTRACT

An apparatus which can easily and reliably prevent leakage of lubricant is provided. The apparatus comprises a casing storing the lubricant at the inside and formed with a hole, a jig which can be taken out from and inserted into the inside of the casing through the hole, and a communication part provided at the jig or at the casing separate from the hole and communicating the inside of the casing with the outside. An amount of outside air corresponding to the volume which the part of the jig occupied at the inside of the casing is introduced to the inside of the casing through the communication part when that part of the jig is pulled out from the inside of the casing.

9 Claims, 10 Drawing Sheets

(56) References Cited

FOREIGN PATENT DOCUMENTS

| DE | 102008044206 A1 | 6/2010 |
|----|----|----|
| JP | 58113630 A | 7/1983 |
| JP | 61105369 A | 5/1986 |
| JP | 2008190609 A | 8/2008 |
| JP | 2012-163215 A | 8/2012 |

* cited by examiner

APPARATUS AND METHOD FOR SUPPLYING LUBRICANT TO MOVABLE MEMBER OF INSTRUMENT

BACKGROUND OF THE INVENTION

1. Field of the Invention

The invention relates to an apparatus and method for supplying lubricant to a movable member of instrument 2. Description of Related Art Known in the past has been an apparatus which provides a movable member such as for example a bearing with a casing for storing a lubricant and which uses the lubricant to lubricate the movable member (for example, Japanese Patent Publication No. 2012-163215A).

At the time of operation of such an apparatus, the temperature of the lubricant in the casing increases, and due to this, the volume of the lubricant increases. As a result, the pressure at the inside of the casing increases and lubricant may end up leaking out from the casing. An apparatus is sought which can easily and reliably prevent such leakage of the lubricant.

SUMMARY OF INVENTION

In an aspect of the invention, an apparatus for supplying a lubricant to a movable member of an instrument comprises a casing which houses at least a part of the movable member and which stores the lubricant inside thereof, a wall of the casing being formed with a hole; a jig which can be pulled out from and inserted into the casing through the hole; and a communication part provided at the jig or the casing so as to be separate from the hole, the communication part fluidly connecting the inside and the outside of the casing.

The apparatus is configured so that an amount of outside air corresponding to a volume of a part of the jig which occupies a space in the casing is introduced into the casing through the communication part when the part of the jig is pulled out from the casing.

The jig may be comprised of a solid member. The communication part may be a second hole formed at the wall of the casing. The communication part may be an outside air path formed at the jig. The apparatus may further comprise a valve which opens and closes the outside air path.

The valve may close the outside air path so that the lubricant in the casing does not pass through the outside air path so as to leak out from the casing when the part of the jig is arranged in the casing, while the valve may open the outside air path so as to introduce the outside air into the casing when the part of the jig is pulled out from the casing.

In another aspect of the invention, a method of introducing a lubricant into a casing which houses at least a part of a movable member of an instrument and which stores the lubricant comprises inserting a jig into the casing; filling a lubricant in the casing; and introducing an amount of outside air into the casing by pulling out the jig from the casing, the amount of outside air corresponding to a volume of the jig which occupies a space in the casing.

The outside air may be introduced into the casing through the hole formed at the casing when pulling out the jig from the casing. The jig may be formed with an outside air path which fluidly connects the inside and the outside of the casing when the jig is inserted into the casing. The outside air may be introduced into the casing through the outside air path when pulling out the jig from the casing.

BRIEF DESCRIPTION OF THE DRAWINGS

These and other objects, features, and advantages of the invention will be clarified with reference to the detailed description of illustrative embodiments of the invention shown in the attached drawings, in which.

DETAILED DESCRIPTION

Figure 1:
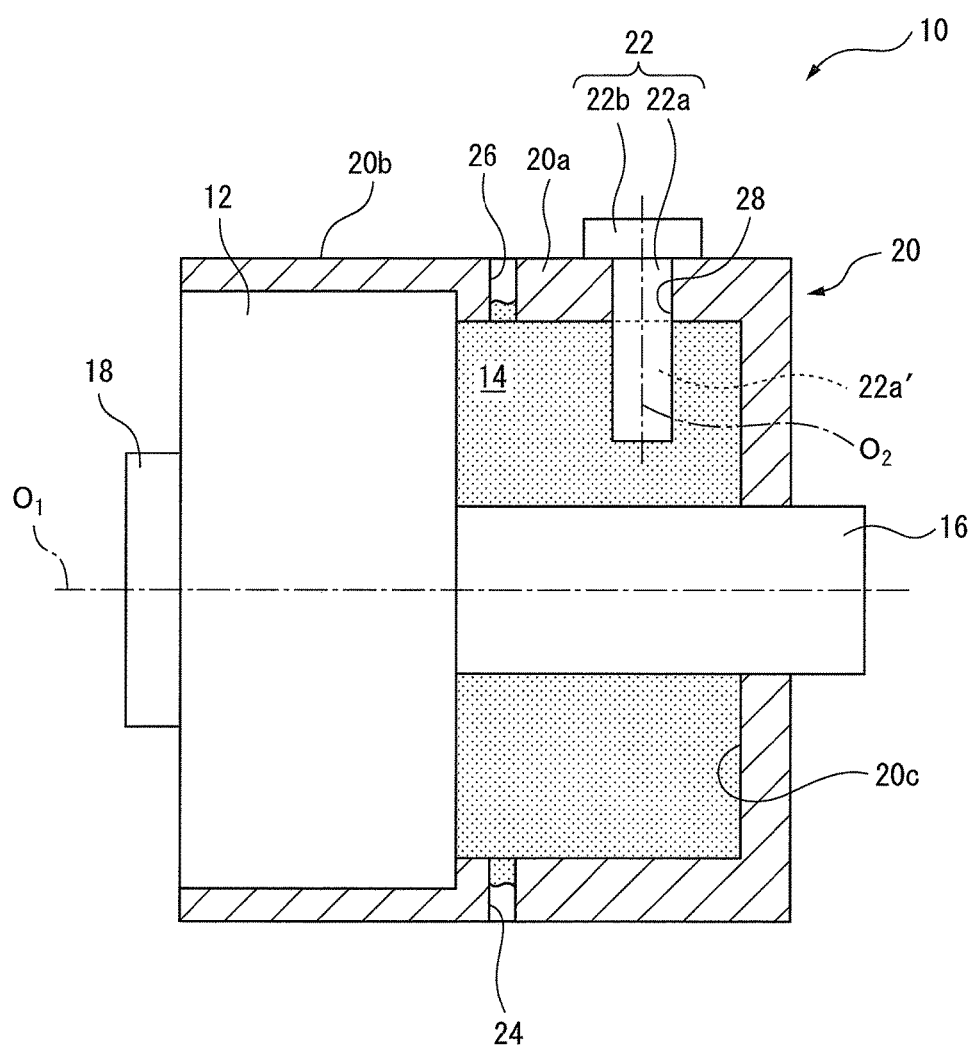
FIG. 1 is a view of an apparatus according to an embodiment of the invention, in which a part of the apparatus is shown by a cross-section.

Below, embodiments of the invention will be explained in detail based on the drawings. First, referring to FIG. 1, an apparatus 10 according to an embodiment of the invention will be explained. Note that, in the following explanation, the axial direction indicates a direction along the axis $O_1$ in FIG. 1, while the radial direction indicates the radial direction of a circle centered about the axis $O_1$.

The apparatus 10 is for supplying a lubricant 14 to a reduction gear 12. The reduction gear 12 is, for example, connected to an output shaft of a servo motor built in a robot, and reduces the rotation speed of the servo motor. The reduction gear 12 includes a movable member such as a gear (not shown). An input shaft 16 is connected to one end in the axial direction of the reduction gear 12, while an output shaft 18 is connected to the other end in the axial direction of the reduction gear 12.

The apparatus 10 includes a casing 20 and a jig 22. The casing 20 is a component referred as "gear box". The casing 20 houses the movable member of the reduction gear 12, and stores the lubricant 14. By lubricant 14, the movable member of the reduction gear 12 can be lubricated.

A wall 20a of the casing 20 is formed with an introduction port 24, a discharge port 26, and a hole 28. The introduction port 24, discharge port 26, and hole 28 extend through the wall 20a, and fluidly connect the inside and the outside of the casing 20.

The introduction port 24 is a hole for introducing the lubricant 14 into the casing 20, while the discharge port 26 is a hole for discharging the lubricant 14 in the casing 20 to the outside. The introduction port 24 and the discharge port 26 are arranged at positions in the casing 20 opposite to each other.

For example, the introduction port 24 and the discharge port 26 are arranged at positions which are symmetrical with each other with respect to the axis $O_1$. When introducing lubricant 14 into the casing 20, a lubricant supply tube (not shown) is connected to the introduction port 24, and a lubricant is supplied into the introduction port 24 via the lubricant supply tube.

If a lubricant is further introduced to the introduction port 24 when the inside of the casing 20 is filled with the lubricant 14 as shown in FIG. 1, the old lubricant 14 present in the casing 20 is pushed out to the outside through the discharge port 26. In this way, the lubricant 14 inside the casing 20 can be changed.

In this embodiment, the introduction port 24 and discharge port 26 are formed to have substantially the same areas (equivalent diameters) as each other. On the other hand, the hole 28 is formed to have an area (equivalent diameter) larger than those of the introduction port 24 and discharge port 26.

The jig 22 is arranged so as to be able to be pulled out from and inserted into the hole 28. The jig 22 is made from a solid member, and includes a shaft part 22a extending along an axis $O_2$ and a flange part 22b projecting outward from one end of the shaft part 22a. Note that, in this embodiment, the axis $O_2$ is arranged so that the direction thereof matches the diametrical direction.

The shaft part 22a has a shape which matches the hole 28. Further, the shaft part 22a has a cross-sectional area (equivalent diameter) equal to or slightly smaller than that of the hole 28. On the other hand, the flange part 22b has a cross-sectional area larger than the hole 28.

The position of the jig 22 shown in FIG. 1 will be referred as an "inserted position". When the jig 22 is arranged at the inserted position, the flange part 22b engages an outside surface 20b of the casing 20, and a part 22a' of the shaft part 22a is arranged inside of the casing 20. The part 22a' is a part of the shaft part 22a located in an inner space defined by the inside surface 20c of the casing 20.

Next, referring to FIG. 1 and FIG. 2, the function of the apparatus 10 will be explained. When supplying a lubricant to the movable member of the reduction gear 12 by the apparatus 10, the user inserts the jig 22 into the hole 28 so as to arrange it at the inserted position.

Then, the user introduces the lubricant 14 into the casing 20 via the introduction port 24 so as to fill the inside of the casing 20 with the lubricant 14. At this time, the discharge port 26 is opened, and the user can recognize that the casing 20 has been filled with the lubricant 14 when the lubricant 14 flows out from the discharge port 26, and stop the introduction of lubricant 14.

Then, the user pulls out the jig 22 from the hole 28 while at least one of the introduction port 24 and discharge port 26 is opened. The effect at this time will be explained with reference to FIG. 2. Note that, FIG. 2 shows an example in which the introduction port 24 is closed by a plug 30 while the discharge port 26 is opened.

Figure 2:
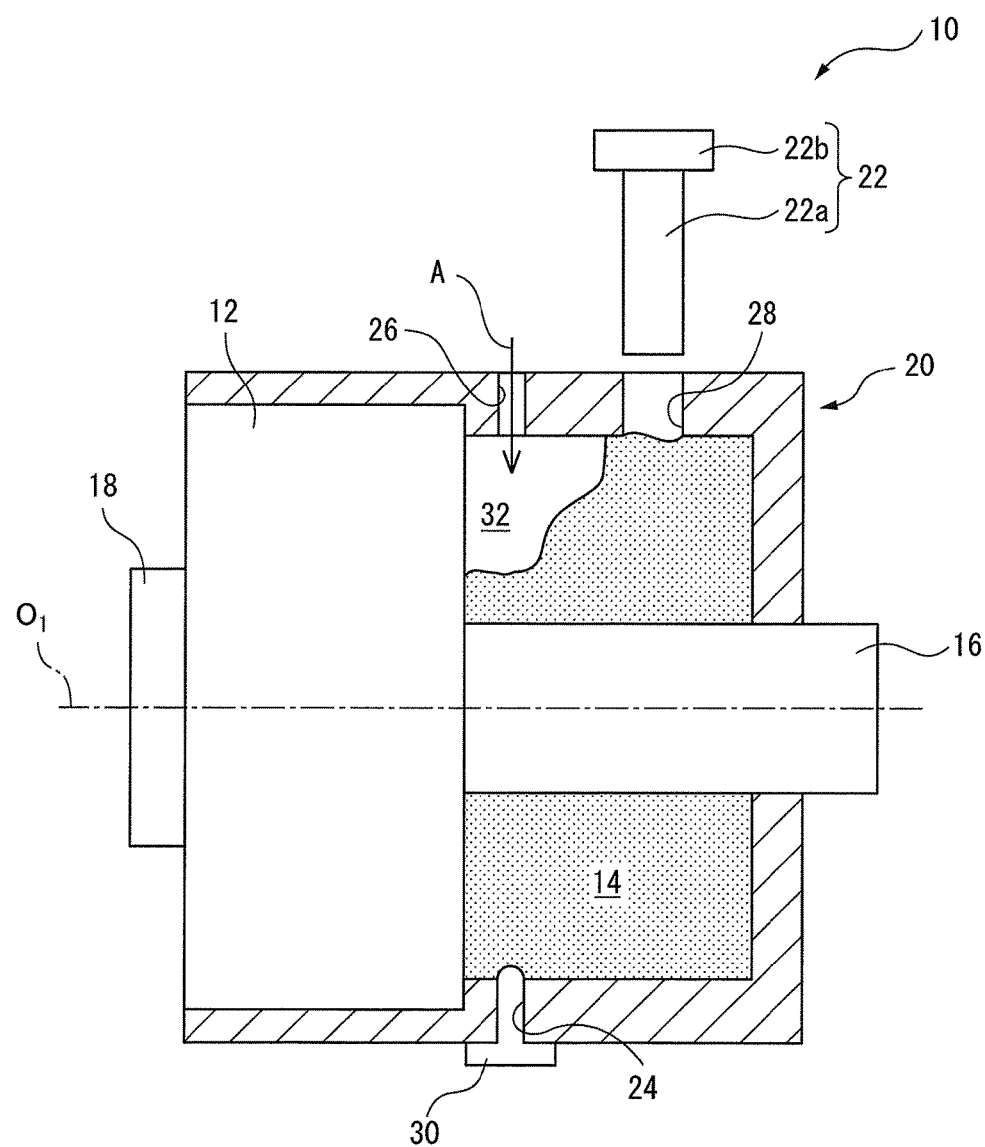
FIG. 2 is a view which shows a state where the jig shown in FIG. 1 has been pulled out from the casing.

As the user pulls out the jig 22 from the hole 28, the outside air is introduced into the casing 20 via the discharge port 26, as indicated by the arrow A in FIG. 2. Thus, in this embodiment, the discharge port (second hole) 26 functions as a communication part for introducing the outside air into the casing 20.

When pulling out the jig 22 from the hole 28 as shown in FIG. 2, an amount of outside air corresponding to a volume of the part 22a' of the shaft part 22a which occupies a space in the casing 20 is introduced into the casing 20 through the discharge port 26.

As a result, an air region 32 is formed in the casing 20 as shown in FIG. 2. After pulling out the jig 22 from the hole 28, the user respectively closes the discharge port 26 and the hole 28 with plugs (not shown) similar to the plug 30.

If the reduction gear 12 is applied to e.g. a servo motor of a robot and operated for a certain time period, the lubricant 14 in the casing 20 will degrade. In this case, the user has to change the degraded lubricant 14. The change of the lubricant 14 in this embodiment will be explained below.

First, the user opens the introduction port 24, discharge port 26, and hole 28, and then inserts the jig 22 into the hole 28 so as to arrange it at the inserted position. Next, the user feeds a lubricant through the introduction port 24. As a result, the old lubricant 14 which has been present in the casing 20 is discharged through the discharge port 26, whereby the old lubricant 14 is replaced with new lubricant 14.

After the lubricant 14 in the casing 20 is replaced, the user closes the introduction port 24 by the plug 30, and then pulls out the jig 22 from the hole 28. Due to this operation, the air region 32 is formed as explained above. Thus, the user can form the air region 32 in the casing 20 at the same time as replacing the lubricant 14 in the casing 20.

According to this embodiment, if the reduction gear 12 is applied to a servo motor of a robot and the volume of the lubricant 14 in the casing 20 increases due to the increase in the temperature of the lubricant 14 during the operation of the servo motor, it is possible to absorb the increase of volume of the lubricant 14 by the air region 32.

Due to this, it is possible to prevent the pressure in the casing 20 from excessively rising, as a result of which it is possible to prevent the lubricant 14 from leaking out from the casing 20 (for example, the seal by an oil seal of the output shaft of the reduction gear 12 is broken).

Further, in this embodiment, the air region 32 can be formed in the casing 20 only by pulling out the jig 22 from the hole 28. According to this configuration, it is possible to prevent the leakage of the lubricant 14 by a simpler configuration.

Further, according to this embodiment, it is possible to appropriately manage the amount of the lubricant 14 introduced into the casing 20 by adjusting the volume of the part 22a' of the jig 22 arranged in the casing 20.

Further, in the technical field of an industrial robot, "removing residual pressure" has been conventionally necessary in order to prevent the leakage of the lubricant during the operation of the robot as explained above. In removing residual pressure, the lubricant is filled in the casing at first, and then the robot is operated while the introduction port and discharge port are opened, thereby the excess lubricant are pushed out from the casing so as to form the above-mentioned air region 32.

According to this embodiment, since the air region 32 can be formed by pulling out the jig 22, it is possible to omit removing residual pressure. Therefore, changing the lubricant of the reduction gear for an industrial robot can be simplified, and therefore it is possible to reduce both the amount of maintenance required and lubricant wasted.

Next, referring to FIG. 3 and FIG. 4, an apparatus 40 according to another embodiment of the invention will be explained. Note that, in the various embodiments explained below, an element similar to the already explained embodiment will be assigned the same reference numeral, and the detailed explanation thereof will be omitted.

The apparatus 40 is for supplying the lubricant 14 to the reduction gear 12, and includes the casing 20 and a jig 42. The jig 42 includes a shaft part 42a extending along the axis $O_3$ (FIG. 4) and a flange part 42b projecting out from one end of the shaft part 42a.

The jig 42 is formed with an outside air path 44. The outside air path 44 is a through hole extending through the jig 42 in the direction of the axis $O_3$ from the end face 42c of the flange part 42b to the front end face 42d of the shaft part 42a. In this embodiment, the outside air path 44 has an area (equivalent diameter) larger than those of the introduction port 24 and discharge port 26.

Further, a valve 46 is provided at the jig 42. The valve 46 is attached to the front end face 42*d* of the shaft part 42*a* so as to open and close the opening 44*a* of the outside air path 44. The operation of the valve 46 will be explained later.

Next, referring to FIG. 3 to FIG. 6, the operation of the apparatus 40 will be explained. When the lubricant is supplied to the movable member of the reduction gear 12 by the apparatus 40, the user firstly inserts the jig 42 into the hole 28 so as to arrange the jig 42 at an inserted position.

When the jig 42 is arranged at the inserted position, the flange part 42*b* engages the outside surface 20*b* of the casing 20, and a part 42*a*' of the shaft part 42*a* is arranged inside of the casing 20.

Figure 3:
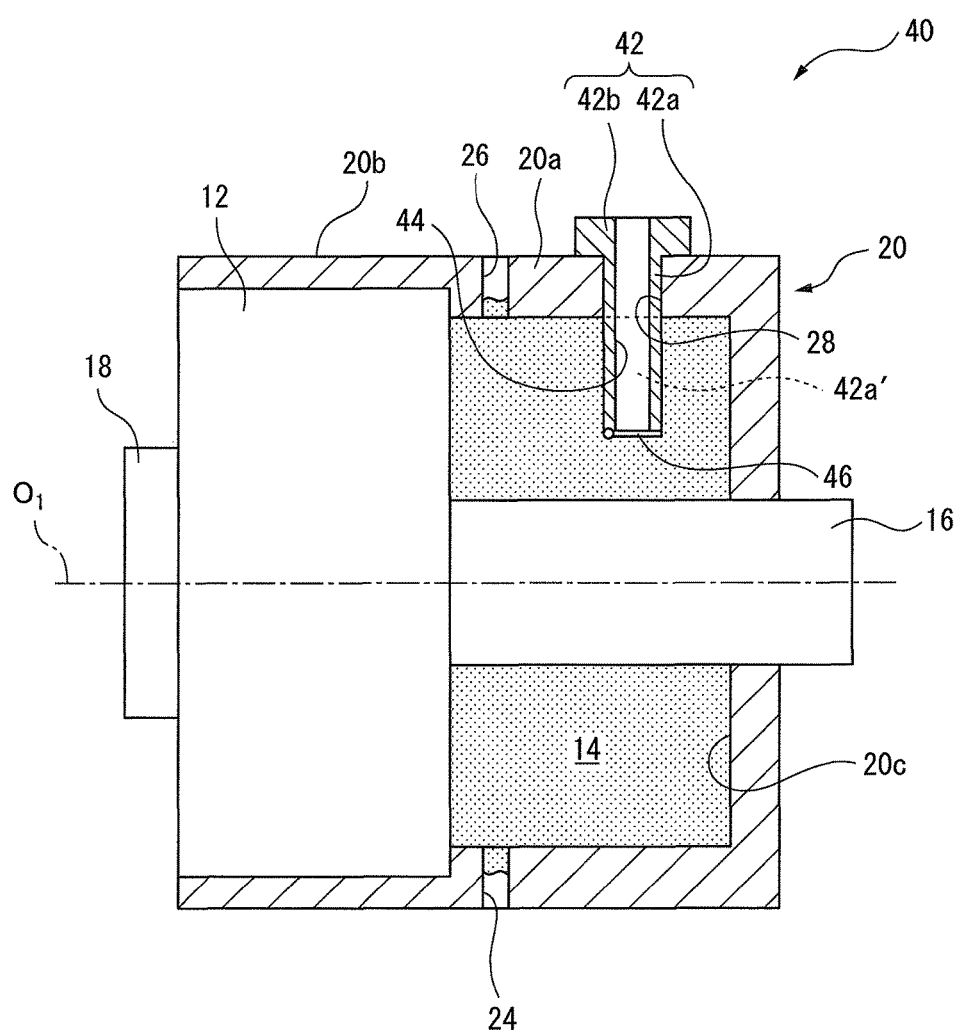
FIG. 3 is a view of an apparatus according to another embodiment of the invention, in which a part of the apparatus is shown by a cross-section.

Then, the user introduces the lubricant into the casing 20 via the introduction port 24 so as to fill the inside of the casing 20 with the lubricant 14, as shown in FIG. 3. In this state, the valve 46 receives a pressure from the filled lubricant 14, thereby is arranged at a position in which the valve 46 closes the opening 44*a* of the outside air path 44.

Figure 5:
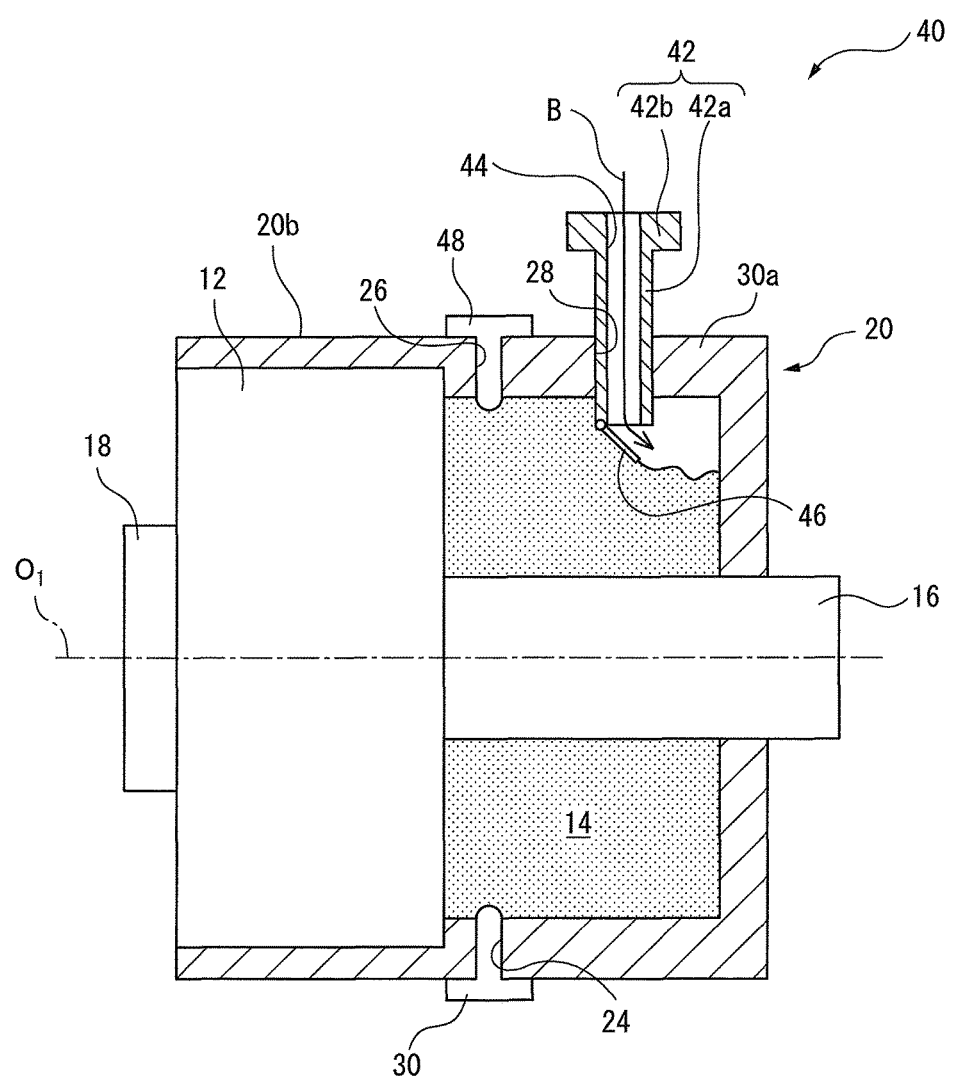
FIG. 5 is a view which shows a state where the jig shown in FIG. 3 is being pulled out from the casing.

Then, the user closes the introduction port 24 and discharge port 26 respectively by means of the plug 30 and plug 48, as shown in FIG. 5. Then, the user pulls out the jig 42 from the hole 28. By this operation, a negative pressure is generated between the front end face 42*d* of the shaft part 42*a* and the lubricant 14 which contacts the front end face 42*d*. Due to the action of the negative pressure, the valve 46 is moved to a position in which the valve 46 opens the opening 44*a* of the outside air path 44.

As the user pulls the jig 42 out from the hole 28, the outside air is introduced into the casing 20 via the outside air path 44 as indicated by the arrow B in FIG. 5. Thus, in this embodiment, the outside air path 44 functions as a communication part for introducing the outside air into the casing 20.

Figure 6:
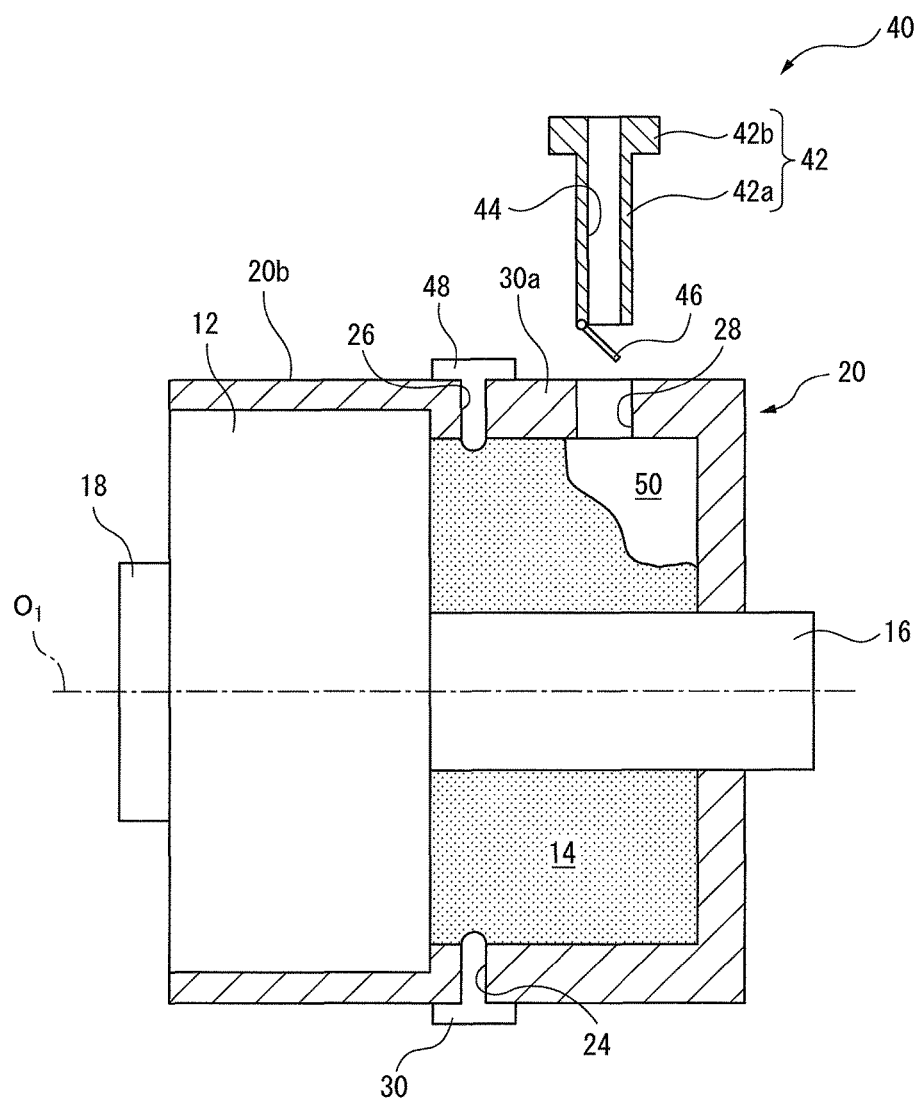
FIG. 6 is a view which shows a state where the jig shown in FIG. 3 has been pulled out from the casing.

When the jig 42 is pulled out from the hole 28 as shown in FIG. 6, an amount of the outside air corresponding to a volume of the part 42*a*' of the shaft part 42*a* which occupies a space in the casing 20 is introduced into the casing 20 through the outside air path 44. As a result, an air region 50 is formed in the casing 20. After pulling out the jig 42 from the hole 28, the user closes the hole 28 by a plug (not shown).

According to this embodiment, the air region 50 can be formed in the casing 20 only by pulling out the jig 42 from the hole 28. Accordingly, it is possible to prevent the leakage of the lubricant 14 during the operation by use of a simpler configuration.

Further, according to this embodiment, the above-mentioned removing residual pressure can be omitted. Due to this, the work of changing the lubricant of the reduction gear can be simplified, and therefore it is possible to reduce the work in the maintenance.

Further, in this embodiment, the outside air is introduced into the casing 20 through the outside air path 44 formed at the jig 42. According to this configuration, it is possible to feed the outside air directly to the space occupied by the part 42*a*' of the shaft part 42*a* in the state of FIG. 3, as the jig 42 is pulled out from the hole 28. Accordingly, it is possible to smoothly replace the space occupied by the part 42*a*' of the shaft part 42*a* with the outside air.

Further, in this embodiment, the outside air path 44 has a larger area than the introduction port 24 and discharge port 26. According to this configuration, it is possible to introduce the air into the casing 20 more smoothly and quickly, along with the operation of pulling out the jig 42 from the hole 28.

Further, in this embodiment, the valve 46 can prevent the lubricant 14 from flowing back through the outside air path 44 so as to leak out, while reliably introduce the outside air into the casing 20 along with an operation of pulling out the jig 42 from the hole 28.

Next, referring to FIG. 7 and FIG. 8, an apparatus 60 according to still another embodiment of the invention will be explained. The apparatus 60 is for supplying the lubricant 14 to the reduction gear 12, and includes the casing 20 and a jig 62.

The jig 62 is made from a solid member, and includes a shaft part 62*a* extending along the axis $O_4$, a first flange part 62*b* projecting out from one end of the shaft part 62*a*, and a second flange part 62*c* projecting out from the other end of the shaft part 62*a*.

At least one of the first flange part 62*b* and the second flange part 62*c* may be detachably attached to the shaft part 62*a*. In this case, the shaft part 62*a* may be formed with a threaded part, while at least one of the first flange part 62*b* and the second flange part 62*c* may be constituted by a member such as a nut able to be screwed over the threaded part.

Next, referring to FIG. 7 and FIG. 8, the operation of the apparatus 60 will be explained. When the lubricant 14 is supplied to the movable member of the reduction gear 12 by means of the apparatus 60, the user firstly fits the jig 62 into the hole 28 as shown in FIG. 7 so as to arrange the jig 62 at an inserted position.

When the jig 62 is arranged at the inserted position, the first flange part 62*b* engages the outside surface 20*b* of the casing 20, and a part 62*a*' of the shaft part 62*a* and the second flange part 62*c* are arranged inside of the casing 20.

Then, the user introduces the lubricant 14 into the casing 20 via the introduction port 24 so as to fill the inside of the casing 20 with the lubricant 14. Then, the user closes the introduction port 24 by the plug 30.

Figure 8:
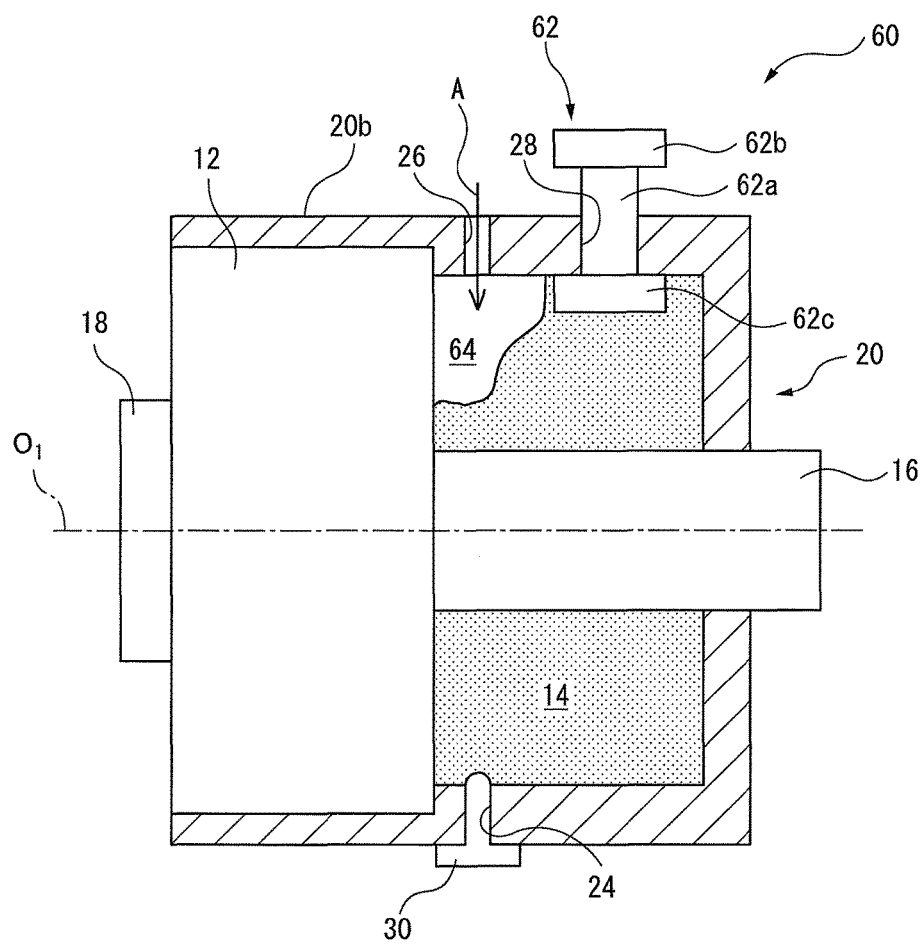
FIG. 8 is a view which shows a state where the jig shown in FIG. 7 has been moved to a retracted position.

Next, the user pulls out the jig 62 from the hole 28 as shown in FIG. 8. As the user pulls out the jig 62, the outside air is introduced into the casing 20 through the discharge port 26, as indicated by the arrow A in FIG. 8.

Then, the user arranges the jig 62 at a retracted position. At the retracted position, the shaft part 62*a* as a whole is arranged at outside of the inner space defined by the inside surface 20*c* of the casing 20. Further, the second flange part 62*c* of the jig 62 engages the inside surface 20*c* of the casing 20.

The part 62*a*' of the shaft part 62*a* is located inside of the casing 20 when the jig 62 is arranged at the inserted position, while is pushed outside of the inner space of the casing 20 when the jig 62 is moved from the inserted position to the retracted position.

When the user pulls out the jig 62 to the retracted position, an amount of the outside air corresponding to a volume of the part 62*a*' which occupies a space inside the casing 20 is introduced into the casing 20 via the discharge port 26.

As a result, an air region 64 is formed in the casing 20 as shown in FIG. 8. After moving the jig 62 to the retracted position, the user closes the discharge port 26 by a plug (not shown).

According to this embodiment, the air region 64 can be formed in the casing 20 only by pulling out the jig 62 from the hole 28. Due to this, it is possible to prevent the leakage of the lubricant 14 during the operation by use of a simpler configuration.

Further, according to this embodiment, the above-mentioned removing the residual pressure can be omitted. Due to this, the work for changing the lubricant of the reduction gear can be simplified, so it is possible to reduce the work in maintenance.

Further, in this embodiment, the hole 28 can be closed by the second flange part 62c when the jig 62 is pulled out to the retracted position. According to this configuration, the user does not have to close the hole 28 by a plug etc. after pulling out the jig 62 to the retracted position. Therefore, it is possible to reduce the number of parts and simplify the work.

Note that, in this embodiment, the jig 62 may be made from a magnetic material so that the jig 62 is moved between the inserted position and the retracted position by e.g. an electromagnet, in a non-contact manner. In this case, the electromagnet may be mounted on the outside surface 20b of the casing 20 so as to adjoin the jig 62.

Figure 9:
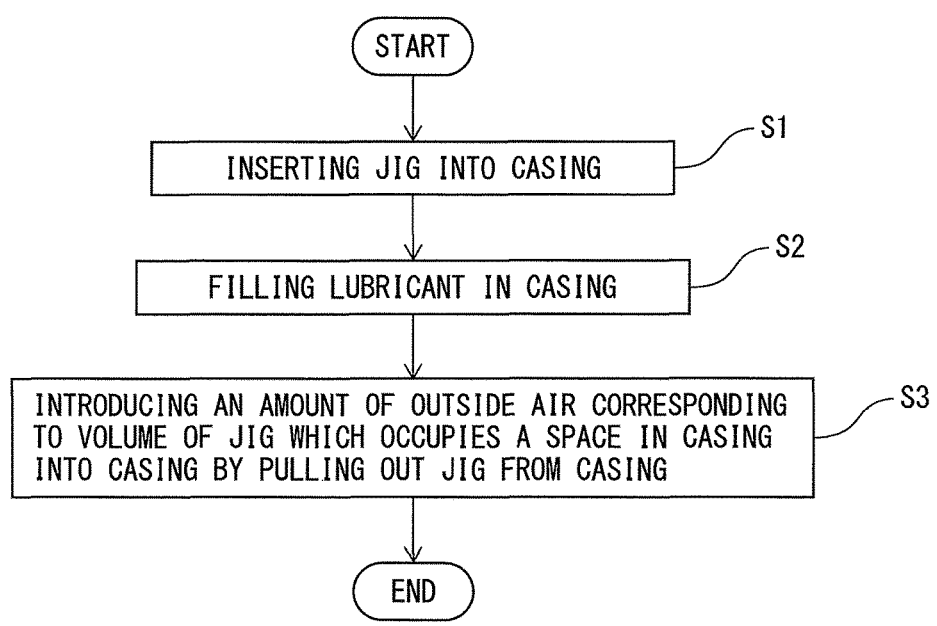
FIG. 9 is a flow chart of a method according to an embodiment of the invention.

Next, referring to FIG. 9, a method of introducing the lubricant 14 into the casing 20 according to an embodiment of the invention will be explained. At step S1, the user inserts the jig 22, 42, 62 into the casing 20. Specifically, the user inserts the jig 22, 42, 62 into the hole 28 of the casing 20 so as to arrange the jig 22, 42, 62 at the inserted position.

At step S2, the user fills the lubricant 14 in the casing 20. Specifically, the user fits the lubricant supply tube into the introduction port 24, and feeds a lubricant into the introduction port 24 via the lubricant supply tube.

At step S3, the user introduces an amount of the outside air corresponding to a volume of the jig 22, 42, 62 which occupies a space in the casing 20 into the casing 20 by pulling out the jig 22, 42, 62 from the inside of the casing 20.

For example, in the case of the embodiment shown in FIG. 1, the user pulls out the jig 22 from the hole 28. Along with this operation, an amount of the outside air corresponding to the volume of the part 22a' of the shaft part 22a is introduced into the casing 20 via the discharge port 26. As a result, the air region 32 is formed in the casing 20.

Further, in the case of the embodiment shown in FIG. 3, the user pulls out the jig 42 from the hole 28. Along with this operation, the valve 46 opens the opening 44a and an amount of the outside air corresponding to the volume of the part 42a' of the shaft part 42a is introduced into the casing 20 via the outside air path 44. As a result, the air region 50 is formed in the casing 20.

Figure 4:
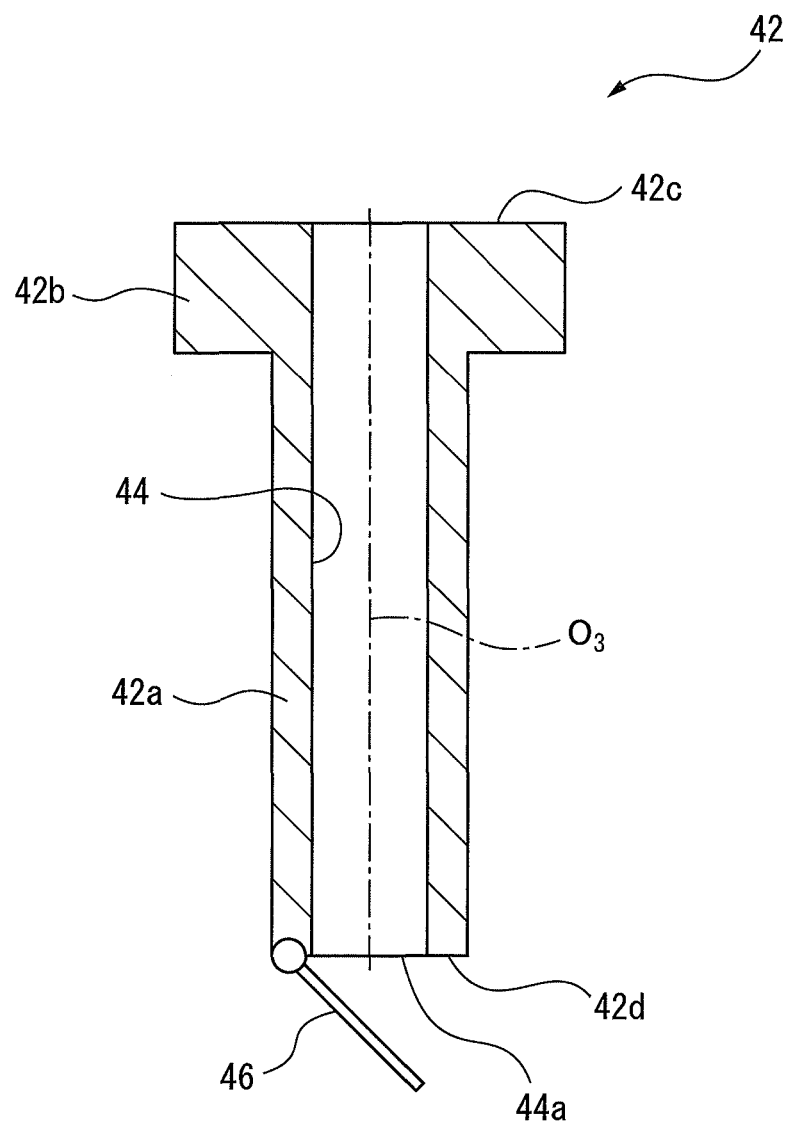
FIG. 4 is a cross-sectional view of the jig shown in FIG. 3.

Further, in the case of the embodiment shown in FIG. 4, the user (or electromagnet) moves the jig 62 to the retracted position. Along with this operation, an amount of the outside air corresponding to the volume of the part 62a' of the shaft part 62a which occupies a space in the casing 20 is introduced into the casing 20 via the discharge port 26. As a result, the air region 64 is formed in the casing 20.

By this method, the user can easily prevent the lubricant 14 from leaking out from the casing 20 during the operation, and can omit removing the residual pressure, and therefore it is possible to reduce the amount of maintenance required.

Note that, in the above-mentioned embodiments, the apparatuses 10, 40, and 60 are used for supplying the reduction gear 12 with the lubricant 14. However, the apparatuses 10, 40, and 60 can be applied to a lubrication structure for e.g. a bearing.

In this case, the casing 20 is an element which defines a so-called "grease reservoir", and arranged so as to accommodate a movable member of the bearing such as a roller and store the lubricant inside thereof. According to this configuration, it is possible to easily prevent the leakage of the lubricant 14 during the operation and reduce the maintenance of the bearing.

Further, in the embodiments shown in FIG. 2 and FIG. 8, the introduction port 24 is closed by the plug 30 when the jig 22, 62 is pulled out. However, both of the introduction port 24 and discharge port 26 may be opened when the jig 22, 62 is pulled out.

Figure 7:
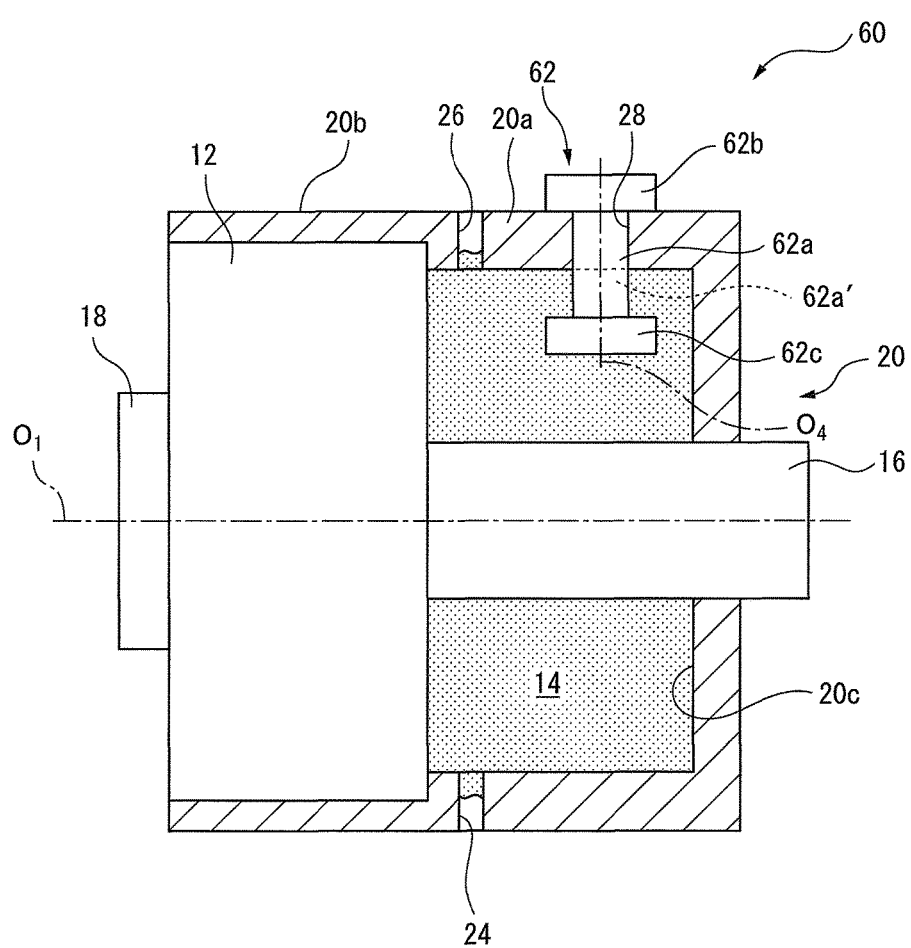
FIG. 7 is a view of an apparatus according to still another embodiment of the invention in which a part of the apparatus is shown by cross-section.
Figure 7A:
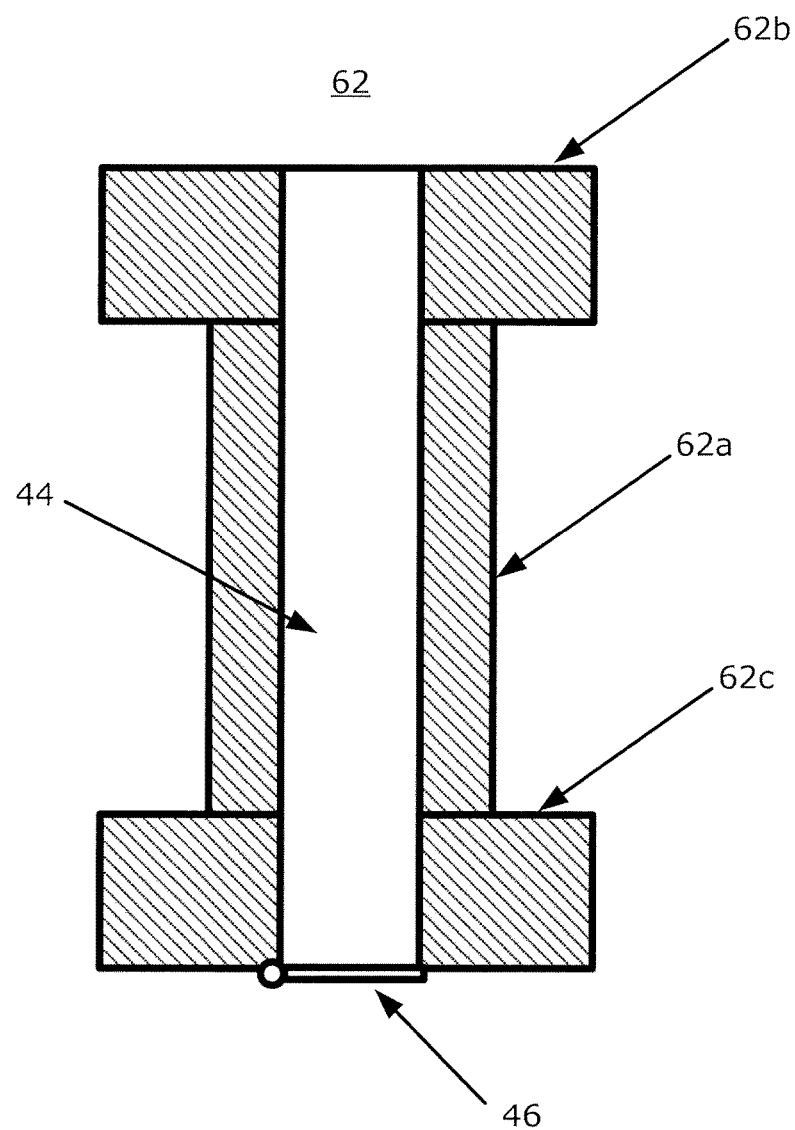
FIG. 7A is a cross-sectional view of a modified version of the jig shown in FIG. 7.

Further, the features of the embodiments shown in FIG. 1, FIG. 3, and FIG. 7 may be combined. For example, as shown in FIG. 7A, the jig 62 shown in FIG. 7 may be formed with the outside air path 44 shown in FIG. 3. In this case, the jig 62 is formed with an outside air path extending through the jig 62 in the direction of the axis $O_4$.

Further, in the embodiment shown in FIG. 3, the valve 46 is attached to the front end face 42d of the shaft part 42a. However, the valve may be arranged inside the outside air path 44, or arranged on the end face 42c of the flange part 42b. Further, the valve may be any type of valve so long as able to open and close the outside air path.

Above, embodiments of the invention were used to explain the invention, but the above embodiments do not limit the inventions according to the claims. Further, combinations of the features which are explained in the embodiments of the invention may also be included in the technical scope of the invention. However, not all of the combinations of these features are necessarily essential for the solution of the invention. Further, the fact that the above embodiments can be changed or improved in various ways would be clear to a person skilled in the art.

Further, it should be noted that the operations, routines, steps, stages, and other processing in the device, system, program, and method in the claims, specification, and drawings, unless particularly clearly indicated by "before", "in advance of", etc. or the output of prior processing being used for later processing, can be realized in any order. In the flow of operations in the claims, specification, and drawings, even if explained using "first", "next", "then", etc. for convenience, this does not mean the execution in this order is essential.

The invention claimed is:

1. An apparatus for supplying a lubricant to a movable member of an instrument, comprising:
   a casing which houses at least a part of the movable member and which stores the lubricant inside thereof, a wall of the casing being formed with a hole; and
   a jig which extends along an axis and which can be pulled out from and inserted into the casing through the hole, the jig including an outside air path defined by a through hole extending through the jig in the direction of the axis,
   wherein
   the apparatus is configured so that an amount of outside air corresponding to a volume of a part of the jig which occupies a space in the casing is introduced into the casing through the outside air path when the part of the jig is pulled out from the casing.

2. The apparatus according to claim 1, wherein the apparatus further comprises a valve provided at the jig so as to open and close the outside air path, wherein
   the valve closes the outside air path so that the lubricant in the casing does not pass through the outside air path so as to leak out from the casing when the part of the jig is arranged in the casing, while the valve opens the outside air path so as to introduce the outside air into the casing when the part of the jig is pulled out from the casing.

3. The apparatus according to claim 1, wherein the wall of the casing is further formed with a second hole for introducing or discharging the lubricant into or from the inside of the casing, wherein the outside air path has an area larger than the second hole.

4. A method of introducing a lubricant into a casing which houses at least a part of a movable member of an instrument and which stores the lubricant, comprising:

inserting a jig into the casing through a hole formed at a wall of the casing;

filling a lubricant in the casing; and introducing an amount of outside air into the casing through a communication part provided through the jig or the casing so as to be separate from the hole and fluidly connecting the inside and the outside of the casing by pulling out the jig from the casing, the amount of outside air corresponding to a volume of the jig which occupies a space in the casing.

5. The method according to claim 4, wherein the communication part is a second hole formed at the wall of the casing, wherein the outside air is introduced into the casing through the second hole formed at the casing when pulling out the jig from the casing.

6. The method according to claim 4, wherein the jig is formed with an outside air path which fluidly connects the inside and the outside of the casing when the jig is inserted into the casing, wherein the outside air is introduced into the casing through the outside air path when pulling out the jig from the casing.

7. An apparatus for supplying a lubricant to a movable member of an instrument, comprising:

a casing which houses at least a part of the movable member and which stores the lubricant inside thereof, a wall of the casing being formed with a hole;

a jig which can be pulled out from and inserted into the casing through the hole, the jig including:

a shaft part extending along an axis and inserted into the hole;

a first flange part projecting out from one end of the shaft part; and a second flange part projecting out from the other end of the shaft part, the jig being movable between a inserted position at which the first flange part engages an outside surface of the casing and a retracted position at which the second flange part engages an inside surface of the casing; and a communication part provided through the jig or the casing so as to be separate from the hole, the communication part fluidly connecting the inside and the outside of the casing, wherein the apparatus is configured so that an amount of outside air corresponding to a volume of a part of the jig which occupies a space in the casing is introduced into the casing through the communication part when the part of the jig is pulled out from the casing.

8. The apparatus according to claim 7, wherein the communication part is a second hole formed at the wall of the casing.

9. The apparatus according to claim 7, wherein the communication part is an outside air path defined by a through hole formed at the jig so as to extend through the jig in the direction of the axis.

\* \* \* \* \*